United States Patent [19]

Wheeler

[11] Patent Number: 5,662,374
[45] Date of Patent: Sep. 2, 1997

[54] DUMP BODY

[75] Inventor: Michael E. Wheeler, Oran, Mo.

[73] Assignee: Wheeler Steel Works, Inc., Morley, Mo.

[21] Appl. No.: 698,128

[22] Filed: Aug. 15, 1996

Related U.S. Application Data

[63] Continuation of Ser. No. 285,042, Aug. 3, 1994, abandoned.
[51] Int. Cl.$^6$ .................................................. B60P 1/28
[52] U.S. Cl. .................................................. 296/184
[58] Field of Search ........................... 296/183, 184; 298/1 H, 1 R

[56]    References Cited

U.S. PATENT DOCUMENTS 3,499,678  3/1970  Richler ..................... 298/1 H X
3,895,842  7/1975  Fair ........................... 296/184 X
4,273,381  6/1981  Bibgau ....................... 296/184 X Primary Examiner—Dennis H. Pedder
Attorney, Agent, or Firm—Grace J. Fishel

[57]    ABSTRACT

A dump body for mounting on a truck or trailer having a floor with a top surface and an underneath surface and a plurality of spaced apart longitudinal channels on the top surface with complementary ridges on the underneath surface extending to the rear edge of the floor. The floor being supported proximate its rear edge by an apron having a top surface that follows the contours of the underneath surface of the floor at its rear edge.

4 Claims, 3 Drawing Sheets

DUMP BODY

This is a continuation of application Ser. No. 08/285,042, Aug. 3, 1994, now abandoned.

BACKGROUND OF THE INVENTION

1. Field of the Invention

The present invention relates to a dump body with a channeled floor and a mating channeled apron for mounting on a frame of a truck or trailer.

2. Brief Description of the Prior Art

A dump body has a pair of side walls, a front wall and a floor secured together to form an integral unit. The floor is mounted on a pair of longitudinally extending support beams and an apron is attached underneath the floor proximate its rear edge. With use, the floor will sag between the beams and between the beams and the side walls, forming three shallow, parallel longitudinal channels, except along the front wall and, more importantly, along the rear edge where it is supported by the apron. As the floor sags, the rear edge forms a dam, causing load hang-up that worsens with use.

Floor sagging has been addressed in a number of ways, none being entirely satisfactory. When the floor is reinforced with a plurality of transversely extending cross members welded to the underneath side of the floor, it still sags between supports, forming a washboard, causing load hang-up. Floor sagging can be reduced by making the floor of heavier plate or by reinforcing it with a heavy substructure, increasing the weight of the dump body and affecting the size of the payload with respect to laws that regulate the total load weight of the vehicle.

SUMMARY OF THE INVENTION

In view of the above, it is an object of the present invention to provide a dump body that reduces load hang-up without going to extremes in plate thickness or substructure. It is another object to provide a dump body with a floor that will discharge the load without hang-up, as smoothly at the end of its useful life as it did when it was first put into service. Other objects and features of the invention will be in part apparent and in part pointed out hereinafter.

In accordance with the invention, a dump body has a pair of side walls, a front wall and a floor forming an integral unit supported on a pair of longitudinally extending support beams for mounting the dump body on the frame of a dump truck or dump trailer. The floor has a plurality of spaced apart, longitudinal channels extending to the rear edge of the floor. The floor is supported at its rear edge on an apron having a top surface that follows the contours of the floor at its rear edge.

The invention summarized above comprises the constructions hereinafter described, the scope of the invention being indicated by the subjoined claims.

BRIEF DESCRIPTION OF THE DRAWINGS

In the accompanying drawings, in which one of several various possible embodiments of the invention are illustrated, corresponding reference characters refer to corresponding parts throughout the several views of the drawings in which.

DETAILED DESCRIPTION OF THE INVENTION

Figure 1:
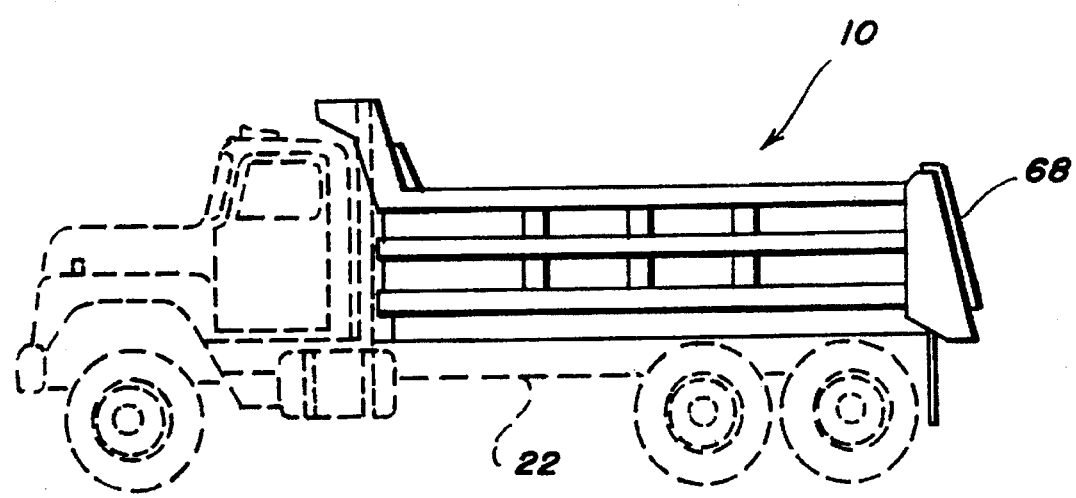
FIG. 1 is a side elevation of a dump body in accordance with the present invention shown mounted on a frame of a truck.
Figure 2:
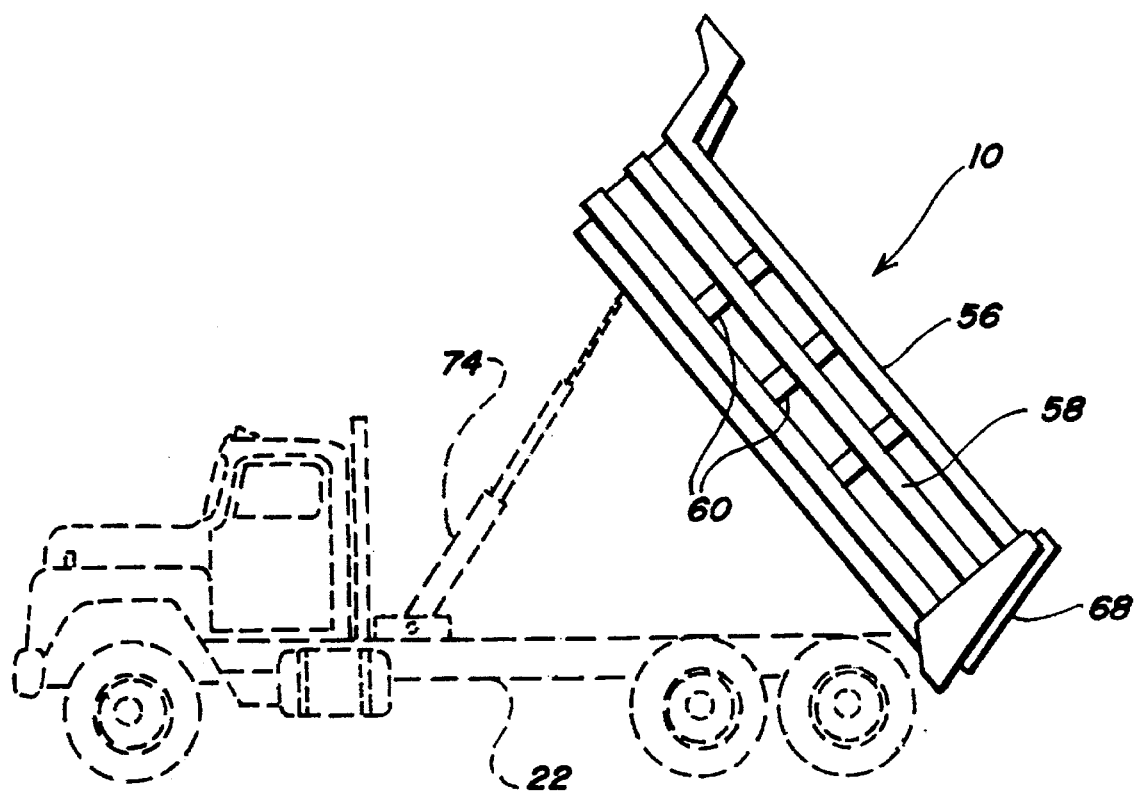
FIG. 2 is a side elevation of the dump body shown in FIG. 1 at full lift.
Figure 3:
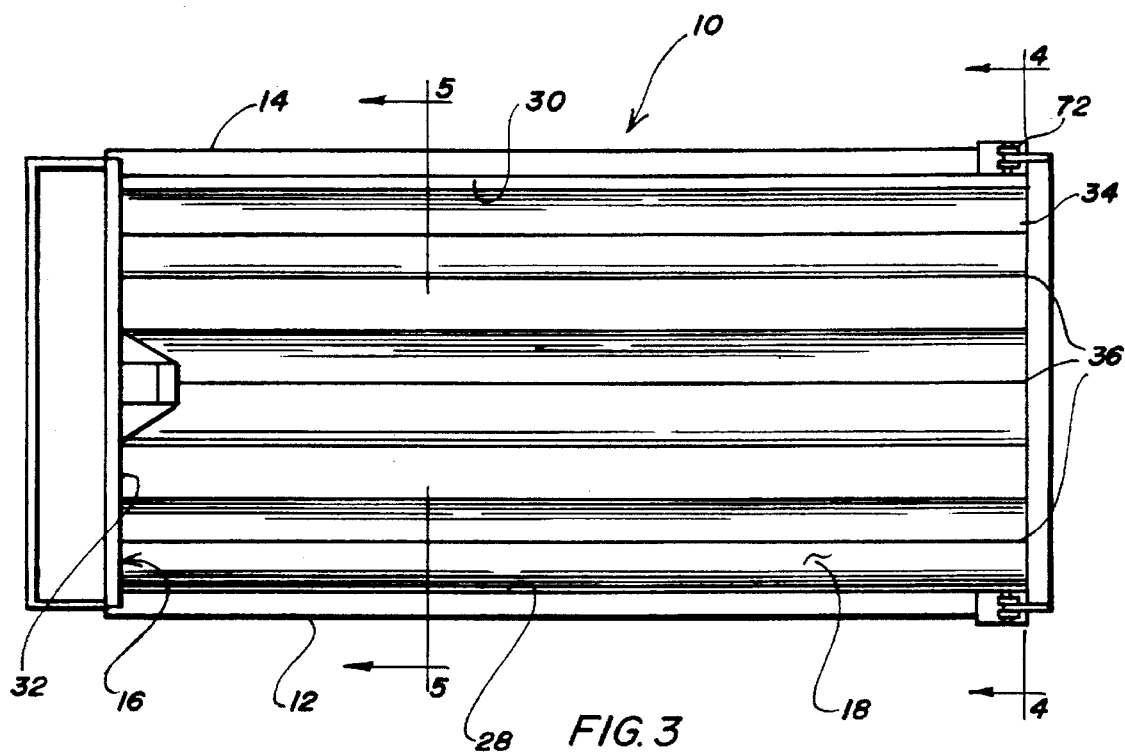
FIG. 3 is a top view of the dump body.
Figure 4:
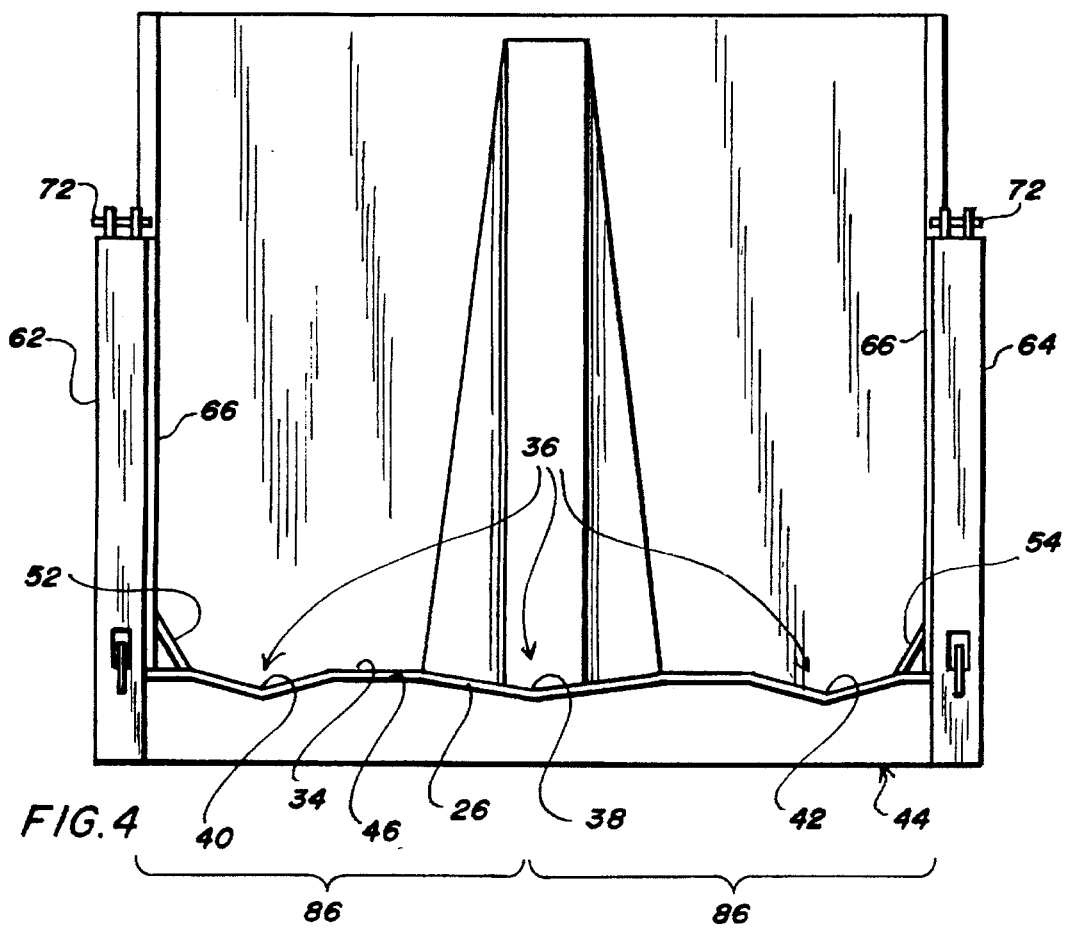
FIG. 4 is a section taken along line 4—4 in FIG. 3.
Figure 5:
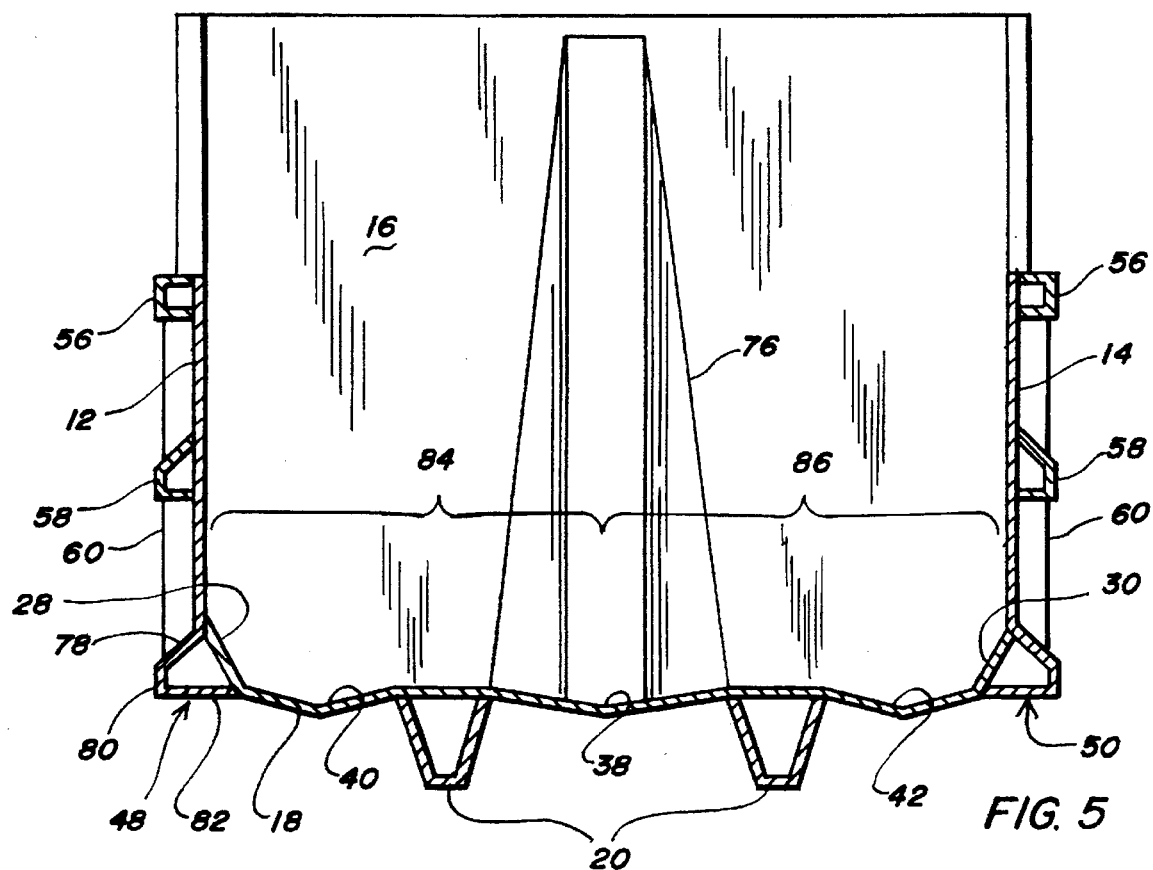
FIG. 5 is a section taken along line 5—5 in FIG. 3.
Figure 6:
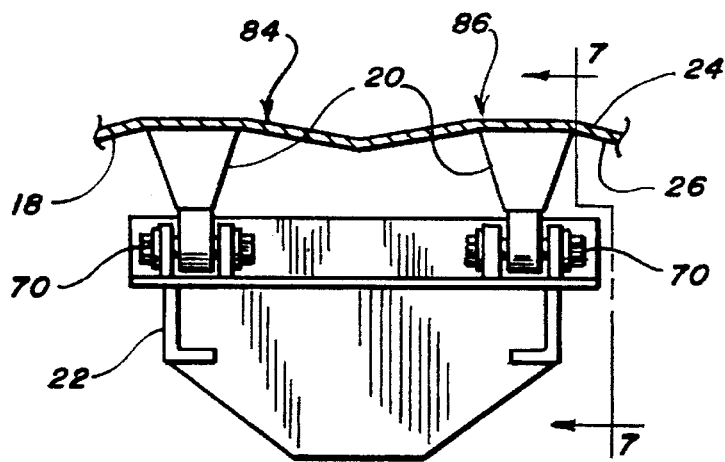
FIG. 6 is a detail showing the dump body pivoted to the frame of the truck; and, FIG. 7 is a section taken along line 7—7 in FIG. 6.
Figure 7:
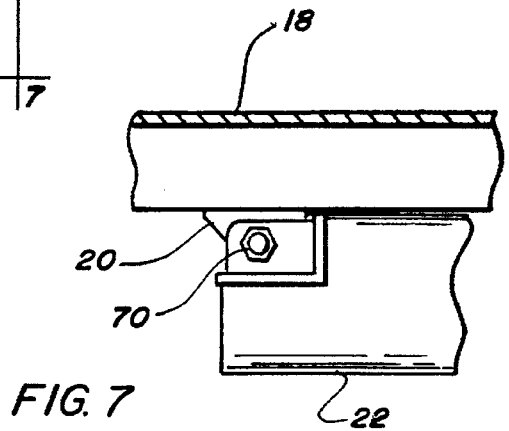

Referring to the drawings more particularly by reference character, reference numeral 10 refers to a dump body in accordance with the present invention. Dump body 10 comprises a pair of side walls 12, 14, a front wall 16 and a floor 18 forming an integral unit supported without cross-members on a pair of longitudinally extending support beams 20 for mounting the dump body on a frame 22 of a dump truck or trailer.

Floor 18 has a top surface 24, an underneath surface 26, lateral side edges 28, 30, a front edge 32 and a rear edge 34. Floor 18 has a plurality of spaced apart, longitudinal channels 36 on the top surface with complementary ridges on the underneath surface, extending to rear edge 34 and preferably running the length of the bed, starting at front edge 32. Channels 36 are provided in floor 18 between support beams 20 and in the floor between support beams 20 and side walls 12, 14. While channels 36 can take a variety of forms and be provided in various numbers, it is preferred that a single central channel 38 be provided between support beams 20 as a wide shallow V-shaped corrugation and, in like manner, a single lateral channel 40, 42 be provided between the support beams and side walls 12, 14, respectively. Proximate rear edge 34, floor 18 is supported by an apron 44 having a top surface 46 that follows the contours of underneath surface 26.

Support beams 20 are welded to floor 18, are hollow and, for the purpose of reinforcing the floor, in a preferred embodiment, preferably V-shaped in cross section, flaring upwardly and outwardly so that the support beams are wider where they attach to underneath surface 26 than where they mount on frame 22. Hollow beams 48, 50 are also provided at the junction of floor 18 with each of side walls 12, 14 to reinforce dump body 10. One side of beams 48, 50 is formed by a pair of lateral flanges 52, 54 extending upwardly and outwardly, which along lateral edges 28, 30 are welded to side walls 12, 14 respectively.

In the particular embodiment shown in the drawings, each of side walls 12, 14 is reinforced along its upper edge by a tubular member 56. An additional tubular member 58 may be provided along the middle with regularly spaced vertical hollow posts 60 joining tubular members 56, 58 and hollow beams 48, 50. Side walls 12, 14 are reinforced at the back by two hollow posts 62, 64 which are welded to tubular members 56, 58, hollow beams 48, 50 and floor 18. A face plate 66 closes hollow posts 62, 64 and is butt welded to side walls 12, 14, forming a continuation thereof. Corner posts 62, 64 extend below floor 18 with apron 44 welded between.

Dump body 10 is closed at the rear by a gate 68 and pivotally mounted on pins 70 secured to the rear of frame 22. Gate 68 is pivotally mounted at its top on pins 72 to corner posts 62, 64. Dump body 10 can be tilted around pins 70 by means of a hydraulic jack 74 located at the front of frame 22. Front edge 32 of floor 18 is notched and front wall 16 includes a central housing 76, tapering upwardly towards front wall 16 and extending into the bed of the dump body, for receipt of the upper end of hydraulic jack 74.

An important feature of dump body 10 shown in the drawings is that it can be efficiently manufactured on a production basis. To this end, hollow beams 48, 50 are formed as an integral part of floor 18 and side walls 12, 14. As shown in the drawings, hollow beams 48, 50 are trapezoidal in cross-section with a sloped outer side wall 78, vertical wall 80, horizontal wall 82 and a sloped inner side wall formed by lateral flanges 52, 54. Walls 78, 80 and 82 are formed by subjecting side walls 12, 14 to a bending action in a conventional machine. Similarly, lateral flanges 52, 54 are bent as an integral part of floor 18. The formed parts are connect by two butt welds and side walls 12, 14 and floor 18 thereby interconnected with a strong box section reinforcement.

For ease of fabrication, floor 18 is formed from a single plate and channels 38, 40 and 42 and opposing flanges 52, 54 are symmetrical. Three identical bends are formed in one side of the plate for channels 38, 40 and 42. The plate is then turned over and creased with four identical counterbends at a second angle, one-half the first angle, followed by two identical bends at a third and greater angle to form flanges 52, 54. By reference to the drawings, it will be apparent that the first and second bends are spaced in such manner that there are two flats over support beams 20. Alternatively, floor 18 can be formed from two long metal plates 84, 86, seamed on centerline between support beams 20. Each of plates 84, 86 may also be formed, from two or more smaller plates joined end to end. For uniformity, however, it is preferred that floor 18 be formed from a single plate as welding changes the tensile strength of the plate in the seams, making it more brittle and hard and causing the floor to shape differently in time. This is particularly troublesome along transverse seams, where dams may form, while corrosion is the primary problem along longitudinal seams.

As mentioned in the Brief Description of the Prior Art, it is known that the floor of a dump body tends to sag with use, from experience, by about 1 inch measured from the top of support beams 20, in the course of the first year, forming a dam at the apron. The depth of channels 38, 40 and 42 is therefore preferably 1 inch, the distance a flat floor would normally stretch. When dump body 10 is 8 feet wide, channels 38, 40 and 42 having a one-inch depth can be formed when the first three bends are at 16 degrees and the four counterbends are at 8 degrees. Two opposing bends at 60 degrees make flanges 52, 54. Since apron 44 follows the contours of floor 18, no dam is formed of any substance even after long and heavy use and a load will discharge without hang-up.

Additional numbers of channels 36 are not preferred as they would increase the surface of the floor and might exaggerate sagging. Deeper channels are not preferred if the dump body is to be used for hauling building materials such as chat, asphalt, etc. (a very popular application for a dump truck) as they would cause a metered load (i.e., where gate 68 is chained partly open and the material is unloaded while the truck is moving) to discharge at an uneven rate. For example, if the channels are 6 inches deep, or even 3 to 4 inches deep, and the metered load is chat or the like having a cross-section of 1 inch or so, the pattern of the floor may show in the discharge and it may be necessary to smooth the material with a blade. For this reason, it is preferred that the channels be nominally one inch or less deep.

In use, channels 36 may round out in time but apron 44 does not form a dam at rear edge 34, so that the dump body provides for uniform discharge across the width of the bed, as smooth at the end of its useful life as it did when it was first put into service. The slight indentations in the floor are sufficient to cause the material to start unloading but not deep enough to leave a pattern in the discharge. Another advantage is that the channeled floor makes the dump body more stable when hydraulic jack 74 is fully extended, as the material tends to slide straight out the back. Without channels, the load may slide across the width of the bed, causing the truck to tip over under some circumstances when it is pitched at an angle and on soft footing (e.g., on the crown of a road or the like.)

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A dump body comprising a pair of side walls, each side wall with a lower longitudinal hollow reinforcement, a front wall and a floor forming an integral unit supported on a pair of longitudinally extending support beams for mounting the dump body on a frame of a dump truck or trailer, said floor having a top surface and an underneath surface and first, second and third longitudinal channels on the top surface extending to a rear edge of the floor with complementary ridges on the underneath surface, said first channel extending in a wide, shallow V substantially between the reinforcement of a first of said pair of side walls to an adjacent one of said longitudinally extending support beams, said second channel extending in a wide, shallow V substantially between said longitudinally extending support beams and said third channel extending in a wide, shallow V substantially between the reinforcement of a second of said pair of side walls to an adjacent one of said longitudinally extending support beams, said channels being nominally one inch deep, said floor supported proximate its rear edge by an apron having a top surface that follows a contour of the ridges on the underneath surface of the floor at its rear edge, said floor unsupported between the front wall and the apron and unsupported between the reinforcement of the first of said pair of side walls and the adjacent one of said longitudinally extending support beams and unsupported between the reinforcement of the second of said pair of side walls and the adjacent one of said longitudinally extending support beams.

2. The dump body of claim 1 wherein an upwardly and outwardly flared, longitudinal flange between said first and third channels and said sidewalls joins the floor to each side wall and closes a cross-section of the reinforcement.

3. The dump body of claim 2 wherein the longitudinally extending support beams are flared upwardly and outwardly so that the support beams are wider where they attach to the underneath surface of the floor than where they mount on the frame of the dump truck or trailer.

4. The dump body of claim 1 wherein the side walls are reinforced at the rear with corner posts that extend below the floor and the apron is secured between said corner posts.

* * * * *